United States Patent [19]

Mitchell

[11] 4,262,048
[45] Apr. 14, 1981

[54] HEEL PROTECTOR

[76] Inventor: Davis M. Mitchell, 3354 Shamrock La., Fort Worth, Tex. 76119

[21] Appl. No.: 86,734

[22] Filed: Oct. 22, 1979

[51] Int. Cl.³ .......................... A47L 23/00; B32B 3/30
[52] U.S. Cl. ......................................... 428/99; 15/238; 296/1 F; 428/100; 428/156; 428/179; 428/310
[58] Field of Search ............... 428/158, 156, 180, 182, 428/99, 310, 116, 117, 100, 179; 36/35 R, 71; 15/238, 215; D12/203; 296/1 F

[56] References Cited

U.S. PATENT DOCUMENTS

| | | | |
|---|---|---|---|
| 1,948,327 | 2/1934 | Berwick | 296/1 F |
| 2,667,654 | 2/1954 | Peterson | 15/215 |

FOREIGN PATENT DOCUMENTS 1487003  1/1969  France .................................. 428/180

*Primary Examiner*—Paul J. Thibodeau
*Attorney, Agent, or Firm*—James E. Bradley

[57] ABSTRACT

A protector member for placement on a vehicle floorboard protects the driver's heel from scuffing. The protector member has a pad with an upper convoluted surface. Relatively large peaks are surrounded by valleys. The peaks serve to remove debris, which is collected in the valleys. A barrier, located at the bottom of each valley, serves to prevent the heel from further contact with the debris. Preferably the barrier is a thin strip of film gathered in folds.

2 Claims, 3 Drawing Figures

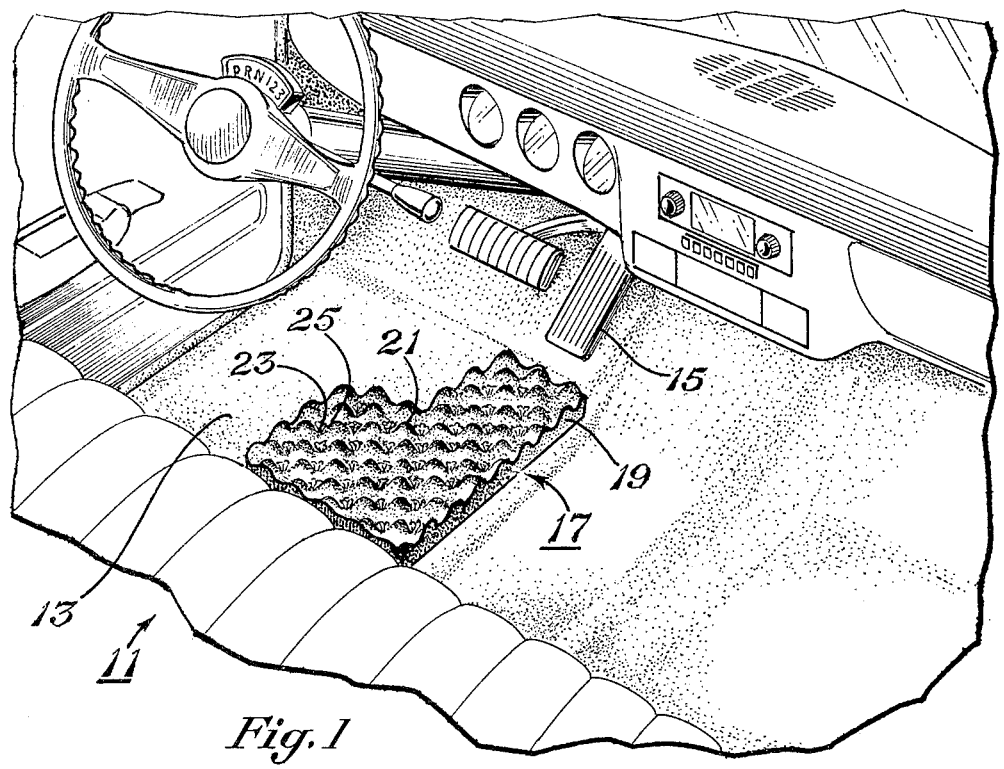
Fig. 1
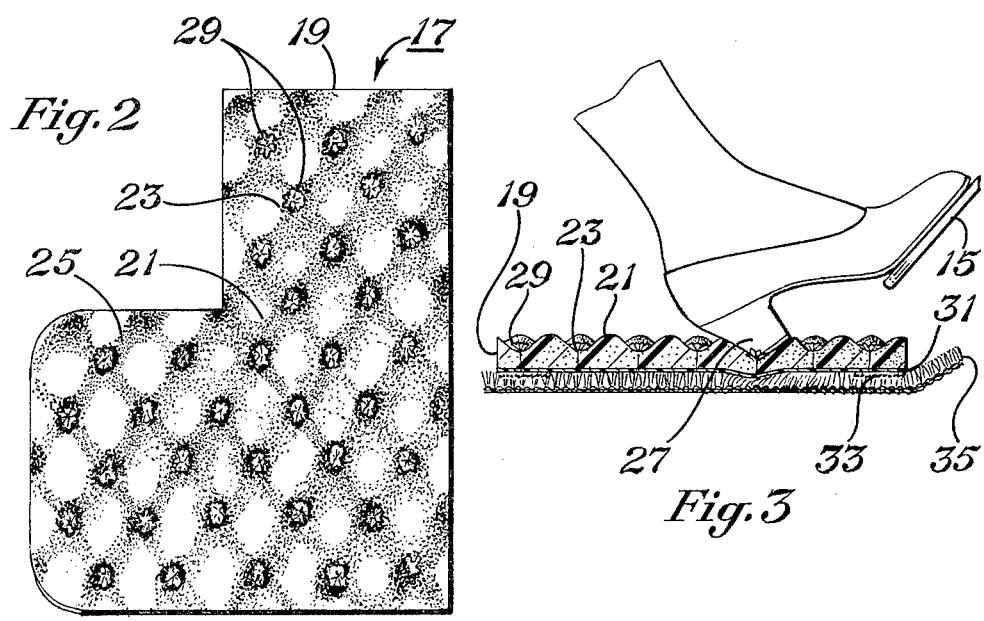
Fig. 2
Fig. 3

HEEL PROTECTOR

BACKGROUND OF THE INVENTION

1. Field of the Invention

This invention relates in general to automobile accessories and in particular to a device for protecting a driver's shoe heel from scuffing.

2. Description of the Prior Art

Drivers of automobiles often experience scuffing and soiling on the side of the shoe at the heel. This scuffing results from dirt and debris being carried onto the floorboard of the vehicle. A typical accelerator pedal is inclined about 45-75 degrees with respect to the horizontal when in the idle position. When the pedal is depressed, this angle increases. Consequently, the driver places his foot on the pedal in an almost vertical position, resulting in the upper heel area being in contact with the floorboard.

In rear-wheeled drive vehicles, there is a large protuberance in the floorboard center to accomodate the drive train. The driver tends to lean his foot against the protuberance. This further causes the right side of the heel of the shoe to come in contact with the floorboard. The debris abrades, scuffs and soils the side of the heel. For men's shoes, a soiled spot will be in the upper section of the heel portion of the shoe, above the sole. For women's shoes with higher heels, the decorative leather on the side of the heel may become soiled. Such soiling occurs whether or not the floorboard is carpeted or whether it has a smooth plastic mat over the top for protection of the carpeting.

SUMMARY OF THE INVENTION

It is accordingly a general object of this invention to provide an improved means for protecting a driver's shoe heel.

It is a further object of this invention to provide an improved means for protecting a driver's shoe heel with a device that removes debris from the side of the driver's heel to avoid abrasion and soiling.

It is a further object of this invention to provide an improved means for protecting a driver's shoe heel with a device that removes debris from the side of a driver's heel to avoid abrasion and soiling, and places the removed debris in a place where it cannot contact and abrade the heel.

In accordance with these objects, a protector member is provided that includes a pad for placement on the floorboard below and to the rear of the accelerator pedal. The pad has a cushioning layer with a convoluted upper surface. The upper surface includes a plurality of relatively large peaks surrounded by valleys. The peaks remove debris from the shoe, allowing it to fall into the valleys. A strip of film in each valley is gathered to receive debris in its folds. This serves to prevent the debris from further contact with the heel.

BRIEF DESCRIPTION OF THE DRAWINGS

FIG. 1 is a perspective view of a portion of the interior of an automobile with a heel protector constructed in accordance with this invention.

FIG. 2 is a front elevational view of the heel protector of FIG. 1.

FIG. 3 is a vertical sectional view of the heel protector of FIG. 1.

DESCRIPTION OF THE PREFERRED EMBODIMENT

Referring to FIG. 1, vehicle 11 has a floorboard 13. An accelerator pedal 15 is mounted at the forward end of the floorboard. As shown also in FIG. 3, the pedal 15 is inclined with respect to the horizontal at an angle typically between 45-75 degrees.

A protector member 17 is located on the floorboard adjacent pedal 15. Protector member 17 is a pad that may be of generally rectangular configuration, but preferably is in a general "L" shape. A portion extends up under the accelerator pedal 15, while another portion extends laterally a short distance.

Protector member 17 has a layer 19 of cushion material, preferably of a cellular foam material, such as polyether. Layer 19 has an upper surface that is convoluted. As shown in FIG. 3, the upper surface is made up of a plurality of relatively large protuberance or peaks 21 surrounded by valleys 23. When viewed in vertical cross-section, as shown in FIG. 3, each peak 21 has a rounded or arcuate portion at its top that is identical to a rounded or arcuate portion in each valley 23. As shown in FIG. 2 the peaks 21 and valleys 23 are equally spaced in a diamond pattern. A single peak 21 is surrounded by four valleys 23, and vice-versa. The peaks 21 have gradual slopes and are joined together by ridges 25. The lowest point of each ridge 25 is about one-half the distance between the base of each valley 23 and the top of each peak 21, measured vertically. The symmetry of the valleys 23 and peaks 21 will allow two layers 19 to nest together if they are brought into contact facing each other.

As shown in FIG. 3, the valleys 23 must be relatively deep to receive a portion of the shoe heel 27. Also, the horizontal distance between peaks 21 must be sufficient to accomodate a portion of shoe heel 27. In the case of men's shoes, the semi-circular rear portion of a heel may be as large as four inches in diameter. In order to accomodate men's and women's shoes, preferably the peaks 21 are one and one-half inches apart, measured horizontally from centerline to centerline. The bottom or base of each valley 23 is one inch below the top of each peak 21, measured vertically. That is, the horizontal plane in which the tops of the peaks 21 lie is one inch above the horizontal plane in which the bases of the valleys 23 lie. Consequently, the vertical distance from the base of each valley 23 to the top of each peak 21 is more than half the horizontal distance between the centerlines of adjacent peaks. The ridges 25 are midway between the base of each valley 23 and the top of each peak 21.

A strip of thin, flexible, plastic film 29 is secured at the base of each valley 23. Film 29 is about 0.002 inch in thickness and is impervious to water. Film 29 is gathered into folds and secured at a single point to the base of each valley 23 by glue, stitching, or other suitable connection. When secured, the folds protrude upwardly to a distance of about ⅜ inch, ⅛ inch below the lowest point of each ridge 25.

Protector member 17 has a base layer 31, as shown in FIG. 3, that is of flexible fluid impervious material such as vinyl. Base layer 31 is co-extensive with the outer dimensions of the protector member 17. Preferably, the protector member 17 has means for securing it to the floorboard of a vehicle so as to prevent it from slipping. The connection means should allow the protector member 17 to be withdrawn from time to time to remove debris collected therein. As shown in FIG. 3, the connection means may be Velcro strips 33 that mate with each other to secure the protector member 17 to the floorboard. The Velcro strips may have adhesive backing, or may be sewn to the base layer 31. Similar Velcro strips 33 may be secured by adhesive, snaps, or the like to the floorboard 13. The upper surface of floorboard 13 may consist of carpet 35 as shown in FIG. 3 or a vinyl type material. Also, a vinyl floor mat may cover carpet 35 for protection. If so, the protector member 17 will be secured to the floor mat. Also, the securing means could consist of a nonskid lower surface formed on the bottom of base layer 31.

In operation, protector member 17 is secured below the accelerator pedal 15, as shown in FIG. 1. When the driver's shoe is resting on the accelerator pedal, the heel 27 will be located in one or more of the valleys 23, compressing the cushioning layer 19 to a certain extent. The slopes or sides of the peaks 21 will bear against the side of the sole heel 27. In the case of men's shoes, with relatively thin sole heels, the slopes of the peaks 21 will also bear against the sides of the upper portion of the shoe, above the sole heel. As the driver normally moves his foot, the slopes of the peaks 21 remove by abrading action any debris collected on the heel 27. This debris, and any other debris brought into the vehicle proceeds into the folds of films 29 and to the bottoms of the valleys 23. The films 29 will be folded over the bases of the valleys 23 to some extent by the pressure of the heel 27, and the folds will receive the debris. The films 29 serve as barrier means to collect the debris and to prevent the heel 27 from further contacting the removed debris, avoiding soiling.

It should be apparent that an invention having significant advantages has been provided. The protector member both removes debris from the driver's shoe heel, and positions the debris below the film strips, to avoid further abrasion and soiling. The protector member is easily installable in existing vehicles, or can be attached at the factory to carpets or to conventional floorboard mats. The protector member is simple in construction and inexpensive. It can be removed for cleaning, thus should have a relatively long life.

While the invention has been shown in only one of its forms, it should be apparent that it is not so limited but is susceptible of various changes and modifications thereof.

I claim:

1. A protector member for protecting a shoe heel of a vehicle driver from scuffing, comprising in combination:

a pad adapted to be located on the floorboard of a vehicle adjacent an accelerator pedal, the pad having an upper surface of cushioning material containing a plurality of depressions; and a piece of flexible film secured in at least some of the depressions and gathered so as to protrude upwardly in folds, the film allowing debris to fall into its folds for avoiding abrading contact of the debris with the heel;

each depression being a valley defined by four surrounding peaks, equally spaced in a diamond pattern, each peak and valley having an arcuate portion when viewed in vertical cross-section, the radius of the arcuate portion of each peak being substantially the same as the radius of the arcuate portion of each valley.

2. A protector member for protecting a shoe heel of a vehicle driver from scuffing, comprising in combination:

a pad having an upper surface of cushioning material with a plurality of peaks protruding from valleys that surround each peak on four sides in an equally spaced diamond pattern, the valleys being of the same configuration as the peaks but inverted, the peaks having an uppermost arcuate portion and gradual slopes;

means for securing the pad to a floorboard of a vehicle adjacent an accelerator pedal; and a piece of flexible film secured in at least some of the valleys and gathered so as to protrude upwardly in folds, the film allowing removed debris to fall into its folds, to avoid abrading contact of the removed debris with the heel.

* * * * *